Figure 1:
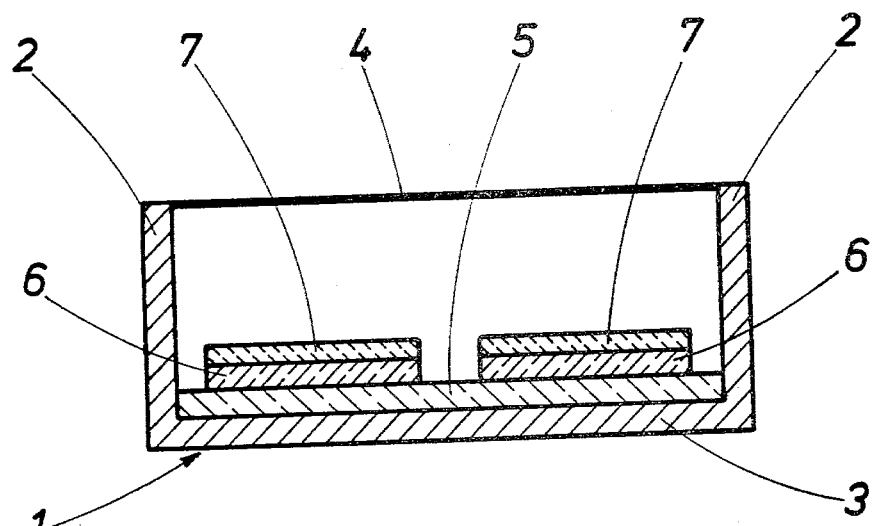

United States Patent [19]
Nolte et al.

[11] 4,259,273
[45] Mar. 31, 1981

[54] FORMATION OF SOLID LAYERS OF MATERIAL

[75] Inventors: Hans-Henning Nolte, Gelsenkirchen, Fed. Rep. of Germany; Pol Baudin, Fontaine-l'Eveque; Marcel De Boel, Chatelineau, both of Belgium

[73] Assignee: BFG Glassgroup, Paris, France

[21] Appl. No.: 103,181

[22] Filed: Dec. 11, 1979

Related U.S. Application Data

[63] Continuation of Ser. No. 893,530, Apr. 4, 1978, abandoned.

[30] Foreign Application Priority Data

Apr. 14, 1977 [GB] United Kingdom ............... 15583/77

[51] Int. Cl.³ .............................................. C04B 35/02
[52] U.S. Cl. ........................................ 264/42; 264/86; 264/212
[58] Field of Search ........................... 264/42, 86, 212

[56] References Cited

U.S. PATENT DOCUMENTS 4,191,805  3/1980  Nolte ...................................... 264/86

*Primary Examiner*—John Parrish
*Attorney, Agent, or Firm*—Cushman, Darby & Cushman

[57] ABSTRACT

A process for forming a solid layer of intumescent material from a fluid material which comprises the steps of pouring the fluid material onto a mold and evaporating the liquid from the fluid material while the fluid material is contained within a chamber offering a predetermined restraint to the escape of vapor from the chamber to the ambient atmosphere.

12 Claims, 2 Drawing Figures

U.S. Patent     Mar. 31, 1981     4,259,273

FORMATION OF SOLID LAYERS OF MATERIAL

This is a continuation of application Ser. No. 893,530 filed Apr. 4, 1978, now abandoned.

The present invention relates to the formation of a solid layer of intumescent material and more particularly to the formation of a solid layer from a fluid material by evaporation of liquid from the fluid.

The invention is particularly concerned with layers formed by evaporation of a solvent from a solution of layer-forming material, but it is believed that the invention will also be useful in processes involving the evaporation of the liquid phase of a suspension of particles of layer-forming material.

The invention is concerned with the surface properties of the solid layer thus formed.

Such layers can be used for many purposes. One particular use which is in view is in the formation of a layer of intumescent material for sandwiching between two sheets (e.g. vitreous sheets) to form a laminated fire-screening panel. If such a panel is to be a transparent glazing panel, then it will be appreciated that the surface properties of the layer formed are of considerable importance, since any irregularity will normally have adverse effects on the optical properties of the panel. At present, the intumescent material most often used in such laminated fire-screening panels is hydrated sodium silicate.

It has been conventional practice to pour a solution of hydrated sodium silicate (or other layer-forming material) into a tray mold and allow it to dry. In fact, the base of such mold is often constituted as one of the sheets of the panel between which the layer is to be laminated.

The drying of the layer presents certain problems. In particular, hydrated sodium silicate tends to form a crusty surface skin before the desired degree of drying throughout the thickness of the layer has taken place. This is also the case with other hydrated metal salts which may be used to form an intumescent layer. This first increases the drying time required and secondly is deleterious as regards the optical properties of a panel incorporating the layer.

A further general problem which is encountered relates to the formation of corrugations and/or cracks in the surface of a layer as it is dried.

It is an object of the present invention to tackle the problems raised on drying of a layer of intumescent material and to provide a method of effecting such drying which will insure that surface defects of the layer caused by evaporation will be reduced.

According to the present invention, there is provided a process for forming a solid layer of intumescent material from a fluid material, which comprises the steps of pouring a fluid material onto a mold and evaporating the liquid from the fluid material while the fluid material is contained within a chamber offering a predetermined restraint to the escape of vapor from the chamber to the ambient atmosphere.

In this way, the vapor pressure of the liquid in the atmosphere within the chamber which is in contact with the fluid material will be higher than it would be if drying were to take place in the open, that is, without using such a drying chamber. In some circumstances, the atmosphere within the chamber may become almost saturated by the vapor given off by the fluid material. Thus, the gradient of the vapor pressure in the atmosphere immediately above the layer forming material will be reduced, and this allows drying to proceed more uniformly to give a better surface quality than is obtainable by drying in the open.

It might seem that, by operating in accordance with the invention, it would be necessary to have a longer drying time than has hitherto been the case, since the drying chamber offers a predetermined restraint to the escape of vapor. In fact, this is not the case, and indeed the drying time necessary when operating in accordance with the invention will usually be shorter than has hitherto been the case. This is because the crusting phenomenon which occurs in the prior art processes (and which is substantially reduced by operating in accordance with this invention) itself inhibits escape of vapor from the layer.

Tests have shown that such crusting and the formation of cracks in the layer can even be eliminated by making use of the present invention.

In some embodiments of the invention, the mold itself constitutes one or more walls of the chamber. Preferably, however, the mold is placed within the chamber in order to dry layer-forming material contained therein.

One or more walls of the chamber may be open or constituted by a perforated sheet material, but preferably, at least one wall portion of the chamber is constituted by a vapor-permeable sheet, the chamber being otherwise closed, since this promotes a more uniform vapor pressure distribution therein.

There are many materials which can be used to form such a vapor-permeable sheet. Such a sheet can be of woven fabric; as, for example, silk-screen material such as is used in the serigraphic art. Preferably, there is at least one vapor-permeable sheet constituted as a semi-permeable polymeric film, since in general such films are particularly convenient to use and can be transparent to allow inspection of a mold while it is in the chamber without exposing it to the ambient atmosphere. In cases where the liquid is water, it is preferred that the polymer should contain hydrophilic groups. This generally leads to increased permeability. Advantageously, a semi-permeable polymeric film is formed of a material selected from cellulose hydrate, cellulose acetate, cellulose butyrate, cellophane, polyvinyl alcohol, ethyl cellulose and polydialkylsiloxane.

The permeability of a film will decrease with increase in thickness, and its strength will increase. Accordingly, a compromise must be found between the required strength and the required permeability, and this optimum film thickness will depend on the material of which it is made. For cellulose hydrate and cellophane, which are at present the most preferred polymeric materials, the preferred thickness lies in the range 25 to 40 $\mu$m.

Preferably, the chamber is heated to speed up the evaporation process. This may, for example, be done by placing a chamber in a drying oven. It is more convenient in practice, however, to heat the walls of a chamber by more direct means. In a particularly preferred practical example, the walls of the chamber are walls of a liquid jacket. This arrangement is particularly suitable when the liquid in the jacket is of the same composition as that to be evaporated from the layer-forming material. This arrangement is especially suitable because it is then very easy to avoid overheating of the layer.

Preferably, at least one chamber wall is electrically heated. Electrical heating is clean and readily controllable. Such heating may be effected, for example, by a wall panel, or, in the case where a liquid jacket is used as a drying chamber, one or more immersion heaters.

The optimum size of the chamber will depend on various factors. The chamber should be large enough so that the desired number of layers can be exposed to the amostphere therein, and in embodiments where one or more molds is to be placed in the chamber, the chamber should be large enough so that this can be done conveniently. However, in order that initial evaporation from the layer shall raise the vapor pressure in the chamber atmosphere to the desired level, the volume of the chamber should not be too large.

It has been found that for good results in a closed chamber having one or more wall portions constituted by a vapor-permeable sheet, the area of such sheet and its spacing from the layer should be such that there is a relative vapor pressure difference of at most 50% between the atmosphere adjacent the layer being dried and the vapor-permeable sheet during at least a portion of the drying period.

The expression 'relative vapor pressure' is used herein to denote the ratio of the pressure of vapor of the same composition as the liquid in the layer actually present in the atmosphere during drying in the drying chamber to the pressure of that vapor which would be present if that atmosphere were saturated at the same temperature. When the liquid in the layer is water, the relative vapor pressure is, of course, the relative humidity.

Preferably there is a relative vapor pressure gradient in a direction from the layer to the vapor-permeable sheet which is between 5 and 15% per 10 cm, and optimally it is about 10% per 10 cm during at least a portion of the drying period.

The optimum size can readily be found by experiment. By way of example, when drying a 3 mm thick layer of hydrated sodium silicate measuring 60×60 cm, it is convenient to use a drying chamber 65 cm to 80 cm square and 20 cm to 50 cm high.

The process according to the invention enables the temperature of the layer-forming material during drying to be increased, preferably to above 50° C., which is highly advantageous since it enables air dissolved in the layer-forming material to be driven off, thus promoting transparency of the layer in a finished panel.

Preferably said intumescent material is hydrated sodium silicate. This is a very efficient fire-screening material which can readily be formed into solid translucent or transparent layers.

The invention extends to a layer of intumescent material formed by a method as herein defined, and includes a light-transmitting fire-screening panel comprising such a layer sandwiched between two light transmitting sheets.

Figure 2:
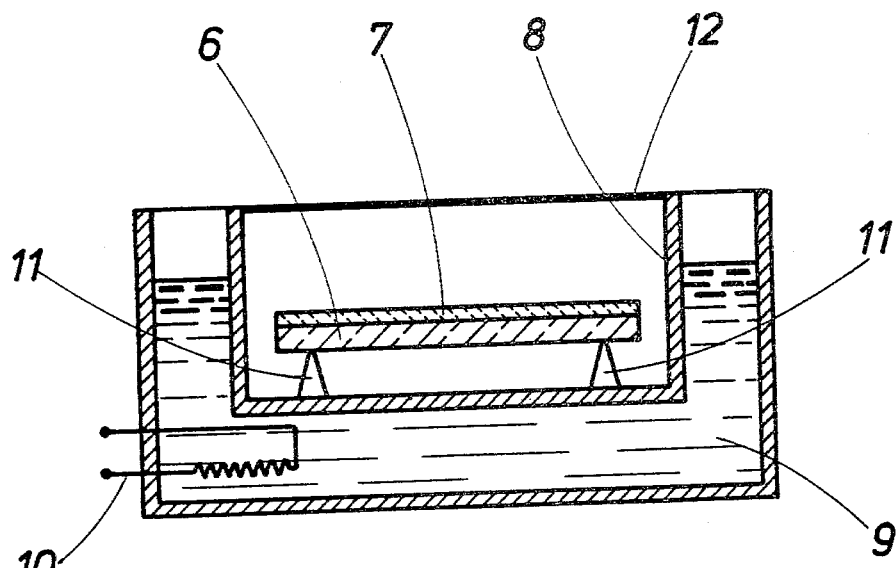

The invention will now be described by way of example with reference to the accompanying diagrammatic drawings in which:

FIGS. 1 and 2 are each a cross-sectional view through a drying chamber in which a layer is being dried by a method according to the invention.

In FIG. 1, a drying chamber 1 has side walls 2 and a base 3. The top of the chamber is constituted by a vapor-permeable sheet 4 and is sealed to the upper edges of the side walls 2. A heating element 5 covers the base 3 of the chamber, and on top of the heating element rest two molds 6 each with a layer 7 to be dried. It will be appreciated that the chamber 1 may be as long as is desired so as to accommodate the required number of panels.

In two specific practical examples, the interior of the chamber 1 measured 70×140 cm. Two molds 6 each 60 cm square were placed in the chamber and it was covered with a sheet 4 of silk screen material such as is used in the serigraphic art which was 30 cm above the base 3. It is especially suitable to use a nylon or polyester screen having pores which occupy 37% to 16% of its surface area (for example 22% of its surface area). The molds 6 contained layers 7 of hydrated sodium silicate in solution which was applied at a rate of 2.8 l/m². The heating element 5 was a glass sheet carrying an electrically conductive layer (not shown) on its underside and was arranged to dissipate between 250 and 400 W/m².

In a first of these examples, the temperature of the upper surface of the heating element 5 was maintained at 50° C. This rise in temperature of the heating element 5 takes about two hours after switching on. It was found that after 24 hours a high quality solid layer of hydrated sodium silicate was formed. This layer contained 35% (by weight) residual water which is a desirable quantity in cases where the layer is to be incorporated as an intumescent layer in a fire-screening panel.

In the second example, the temperature of the heating element upper surface was maintained at 70° C. In this example, the layer was dried to 34% by weight residual water in 10 hours. Again, an extremely high quality transparent layer was formed.

By way of a variant, heating elements can be placed on the side walls 2 of the chamber. Such heating elements may, for example, be glass sheets coated with a heating layer based on $SnO_2$, and it is possible in this way to achieve a temperature of 80° C. in the chamber which allows the layers to be dried to 34% residual water in a time of the order of 6 hours.

In a variant embodiment, the silk screen material is replaced by a sheet of cellulose hydrate 35 μm thick.

Layers of hydrated aluminum phosphate, of hydrated sodium aluminum sulphate and of potassium aluminum sulphate have been dried in a similar way.

FIG. 2 illustrates an embodiment of the invention in which the drying chamber is constituted as a water jacket 8 filled with water 9 which is arranged for heating by an immersion heater 10. A mold 6 and layer 7 rest on supports 11 within the chamber defined by the water jacket, and the top of the drying chamber is covered with vapor-permeable sheet 12. The water jacket 8 can, of course, be made long enough to accommodate any desired number of molds and layers.

In a specific practical example, a single mold 6 and layer 7 identical to those described above was placed in the water jacket 8 whose chamber space measured 70×70×30 cm. The mold 6 and layer 7 were supported approximately one-third of the height of the chamber above its base. The heater 10 was switched on and the water in the jacket was allowed to boil to maintain the temperature in the chamber at the level of the mold at 65° to 70° C. It was found that the layer dried to 34% by weight residual water in 6 hours. Again, a layer with high surface quality was formed. It was, in fact, found that when this process was used, surface faults did appear on the layer of hydrated sodium silicate solution after the first hour of drying, but that by the end of the fourth hour, these defects had largely disappeared.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A process for forming a solid layer of intumescent material comprising hydrated metal salt, from a fluid which comprises the steps of pouring the fluid material onto a mold, placing the mold within a chamber having at least one wall portion which is constituted by a vapor permeable sheet and being otherwise closed so as to offer a predetermined restraint to the escape of vapor from the chamber to the ambient atmosphere without contact of the fluid material with such sheet, and evaporating the liquid from the fluid material while the mold is within said chamber in order to dry layer-forming material contained therein.

2. A process as defined in claim 1 wherein there is at least one vapor-permeable sheet of silk-screen material.

3. A process as defined in claim 1 wherein there is at least one vapor-permeable sheet constituted as a semipermeable polymeric film.

4. A process as defined in claim 3 wherein said semipermeable polymeric film is formed of a material selected from the group consisting of cellulose hydrate, cellulose acetate, cellulose butyrate, cellophane, polyvinyl alcohol, ethyl cellulose and polydialkylsiloxane.

5. A process as defined in claim 4 wherein said polymeric film is of cellulose hydrate or cellophane and said film has a thickness in the range 25 to 40 $\mu$m.

6. A process as defined in claim 1 wherein there is a relative vapor pressure difference of at most 50% between the atmosphere adjacent the layer and said vapor-permeable sheet during at least a portion of the drying period.

7. A process as defined in claim 1 wherein there is a relative vapor pressure gradient of between 5 and 15%, preferably about 10%, per 10 cm adjacent the layer during at least a portion of the drying period.

8. A process as defined in claim 1 wherein said chamber is heated.

9. A process as defined in claim 8 wherein the walls of the chamber are walls of a liquid jacket.

10. A process as defined in claim 8 wherein at least one chamber wall is electrically heated.

11. A process as defined in claim 8 wherein during drying the temperature of the layer forming material is increased to above 50° C.

12. A process as defined in claim 1 wherein the intumescent material is hydrated sodium silicate.

* * * * *